UNITED STATES PATENT OFFICE.

JOHN LORENZ KLEIN, OF NEW YORK, N. Y.

IMPROVED COMPOSITION FOR CANDLES.

Specification forming part of Letters Patent No. 45,160, dated November 22, 1864.

*To all whom it may concern:*

Be it known that I, JOHN LORENZ KLEIN, of the city and county of New York, and State of New York, have invented a new and improved process for making composition candles from paraffine in combination with other substances; and I do hereby declare that the following is a full and exact description thereof.

The nature of my invention is as follows, and to enable others skilled in the art to make and use my invention I will proceed to describe said process and the ingredients composing said composition of matter.

To make the candle, I put thirty (30) gallons of water in a vessel and add to it ten (10) pounds of chloride of lime, five (5) pounds of muriatic acid. I then stir the whole four or five times a day for eight days. Then I leave it to settle until it gets clear. I then take one hundred (100) pounds of raw paraffine and place it in a boiler heated by dry steam to at least one hundred and sixty (160) degrees Fahrenheit. I add to this two (2) gallons of the above mixture. Let the whole boil five minutes. I then turn off the steam, leaving it in the boiler for thirty minutes to clear. I then place the mixture in tin pans, of the capacity of five pounds each, leaving it to cool. When sufficiently cool I then place this mixture in linen bags of the capacity of five pounds, tie the same securely, and place the bags under a hydraulic press of one hundred (100) tons pressure, and press these bags until all of the oil is extracted. I then take one hundred (100) pounds of the mixture last above described and put it into a steam heater boiler, and to this I add one gallon of the preparation or mixture first above described. To this I add two (2) pounds of aqua-ammonia, two pounds of lump alum. I then cause the mixture to boil in a steam-boiler for five minutes. I then turn off the steam, and leave it in the boiler for thirty minutes to clear. I then place it into tin pans holding four or five pounds, and leave it until it becomes cold. I then place it in a mill and grind it until I reduce it to powder. I then put the powder in linen bags holding from four to five pounds each, which I then put under hydraulic pressure of one hundred and fifty tons' pressure, until all the liquid is extracted. I then take one hundred (100) pounds of this last composition, and I add to it ten (10) pounds of mutton-tallow, fifteen (15) pounds of *cera bonica*, (vegetable wax,) two (2) gallons of naphtha. I then turn on dry steam, and let it boil for five minutes. I then turn off the steam, and let it settle for thirty minutes. I then place it in pans of four or five pounds, and let it remain until perfectly cool. When cool I take it, place it in a mill and grind it to powder, and put it in woolen bags of four or five pounds' capacity, and put the woolen bags into linen of like capacity, closing them tight. I then place them under a hydraulic press of three hundred tons' pressure, until all the liquid substance is extracted. I then take one hundred (100) pounds of this last composition or mixture and place it in a copper kettle, and add to this fifteen (15) pounds of sterine, five pounds of spermaceti. I then introduce wet steam into the kettle, leaving the whole to boil for four or five hours. After boiling this length of time this composition or mixture emits no odor. The combination of ingredients of which I make the composition candle is thus completed. I then take one hundred (100) pounds of the mixture or composition of matter thus made and place it in a kettle, and introduce dry steam, and raise the heat to 200° Fahrenheit. I then heat the molds, which are made of tin, and pour the composition into the molds, and expose the molds to an atmosphere of 1° below zero, leaving them for half an hour, when the candles are made.

What I claim as my invention, and desire to secure by Letters Patent, is—

A new and improved process for making composition candles, as herein described, using for that purpose the aforesaid ingredients or composition of matter, or any other substantially the same, and which will produce the intended effect.

JOHN LORENZ KLEIN.

Witnesses:
A. MARKS,
C. HOWARD.